United States Patent
Saghir et al.

(10) Patent No.: US 12,495,379 B2
(45) Date of Patent: Dec. 9, 2025

(54) SMALL CELL ACCESSIBILITY SERVICE

(71) Applicant: Verizon Patent and Licensing Inc., Basking Ridge, NJ (US)

(72) Inventors: Amir Saghir, Frisco, TX (US); Said Hanbaly, Prosper, TX (US); Nimalan Kanagasabai, Grapevine, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 404 days.

(21) Appl. No.: 18/319,861

(22) Filed: May 18, 2023

(65) Prior Publication Data
US 2024/0389045 A1    Nov. 21, 2024

(51) Int. Cl.
*H04W 60/00* (2009.01)
*H04W 48/02* (2009.01)
*H04W 48/18* (2009.01)

(52) U.S. Cl.
CPC .......... *H04W 60/00* (2013.01); *H04W 48/02* (2013.01); *H04W 48/18* (2013.01)

(58) Field of Classification Search
CPC ..... H04W 60/00; H04W 60/04; H04W 48/02; H04W 48/18
See application file for complete search history.

(56) References Cited

U.S. PATENT DOCUMENTS

| | | | |
|---|---|---|---|
| 2011/0218004 A1* | 9/2011 | Catovic | H04W 48/02 455/509 |
| 2012/0309393 A1* | 12/2012 | Shinojima | H04W 60/00 455/435.1 |
| 2021/0360714 A1* | 11/2021 | Zhang | H04L 41/5051 |
| 2022/0124547 A1* | 4/2022 | Young | H04W 28/0247 |

* cited by examiner

*Primary Examiner* — Farid Seyedvosoghi (57) ABSTRACT

A device may include a processor configured to determine that a user device is within a coverage area of a small cell connected to a base station associated with an application service; determine that the user device is not a member of the small cell; identify a network slice for the application service; determine whether a network services subscription for the small cell includes the network slice; perform, when the network services subscription for the small cell includes the network slice, an attachment procedure to the small cell; receive authorization for attaching to the small cell and accessing the application service via the network slice; and initiate a network session on the network slice.

20 Claims, 7 Drawing Sheets

SMALL CELL ACCESSIBILITY SERVICE

BACKGROUND INFORMATION

To satisfy the needs and demands of users of mobile communication devices, wireless network operators continue to improve and expand available application services as well as the networks used to deliver such services. One such improvement includes providing and/or extending wireless signal coverage in a given geographic area by deploying small and/or low-power cellular radio access nodes. As another improvement, the network operator may enable mobile communication devices to request and access the application services via a network slice of a serving cell. Managing different types of connections for a large number of application services under dynamic conditions poses complex technological challenges.

DETAILED DESCRIPTION OF EMBODIMENTS

The following detailed description refers to the accompanying drawings. The same reference numbers in different drawings identify the same or similar elements.

As communication networks and application services increase in size, complexity, and number of users, their optimum management becomes ever more challenging. For example, wireless communication networks are incorporating various aspects of next generation networks, such as 5th generation (5G) mobile networks, utilizing high frequency bands (e.g., 24 Gigahertz, 39 GHz, etc.), and/or lower frequency bands such as Sub 6 GHz, as well as a large number of configurable antenna arrays. 5G New Radio (NR) radio access technology (RAT) may provide significant improvements in bandwidth and/or latency over other wireless network technologies. Additionally, a 5G core network (5GC) supports and manages 5G radio access networks (RANs) that include base stations (or "cells"), which provide various services and enable connections to other networks (e.g., connections to the Internet, etc.). As an example, a 5G core network may provide support for gaming, enhanced Mobile Broadband (eMBB), ultra-reliable low latency communication (URLLC), massive Machine Type Communication (mMTC) or Internet of Things (IoT), and/or other types of communications or application services.

To provide and/or extend wireless 5G signal coverage in a given geographic area, a provider of a wireless communication service may deploy small and/or low-power cellular radio access nodes, such as femtocells, picocells, microcells, and/or the like. A small cell may be a small, low-power cellular base station with a smaller coverage radius than a larger base station (which may be referred to as a "macro cell" or simply "cell"). Each small cell device may be directly connected to a core network device. For example, the small cell device may be configured with a direct connection to a user plane function (UPF) and/or an access and mobility management function (AMF), as well as other core nodes of a 5GC.

A small cell may improve user experience in particular types of environments that are associated with a large number of users in a small area and/or in an area where cell (e.g., 5G) coverage may be inadequate. As an example, a small cell may be deployed in an indoor environment, such as office suites, multi-unit residential structures, high density retail centers, college campuses, etc. As another example, a small cell may be deployed at high-density urban centers and/or in areas with weak signal coverage due to multipath fading, such as an area with substantial tree cover or tall structures.

A small cell may be an open access small cell or a closed access group (CAG) small cell. An open access small cell may be located in a public area and may enable any user equipment (UE) device with an active subscription to use the open access small cell to connect to a 5GC. In contrast, a CAG small cell may restrict access to UE devices that are members of the CAG small cell. That is, a CAG small cell may maintain a list of member UE devices and only UE devices included in the list may be authorized to automatically select and attach to the CAG small cell. As an example, a CAG small cell may be deployed in an apartment building and may restrict access to its residents. As another example, a CAG small cell may be deployed in an office suite and may restrict automatic selection and access to employees.

A non-member UE device may enter the coverage area of a CAG small cell and may be unable to automatically select and attach to the CAG small cell. The non-member UE device in the vicinity of the CAG small cell may experience problems in the uplink and/or downlink channel to a 5GC, resulting in poor or no connectivity, resulting in garbled audio, video pixilation, and/or dropped packets.

Implementations described herein relate to systems and methods for CAG small cell accessibility services, supporting non-member UE devices in the vicinity of CAG small cells, seeking access to an application service via a core network. The systems and methods for CAG small cell accessibility services described herein determine whether a non-member UE device in the vicinity of a CAG small cell is attempting to access an application service via one or multiple slice networks that have been exempted, by the mobile network operator (MNO), for example, from the member status requirements for the CAG small cell. For example, UE devices may be granted access to the CAG small cell, irrespective of their membership status, based on a slice network ID included in a UE route selection policy (URSP) non-access stratum (NAS) message associated with the network registration procedure.

Systems and methods described herein relate to managing authorized access to network slices. UE devices may execute various applications that generate network traffic with different service requirements. The various service requirements may be provided using network slicing. A network slice refers to a complete logical network that includes components of a RAN and 5GC, which provide certain telecommunication services and network capabilities that can vary from slice to slice. Dedication of network slices for a particular type of application service can thus have significant impact on network performance and user experience. Accordingly, MNOs may define exemptions of network slices from requirements for CAG small cell access.

Systems and methods described herein enable MNO-managed network slice access exemptions, allowing a small cell administrator to control which non-member UEs may access a CAG small cell based on network slice subscription. The administrator may define the CAG small cell membership per MDNs and/or a slice basis. In some embodiments, a subscriber identity module over-the-air (SIMOTA) may update the UE with the CAG ID membership and/or the slice ID subscription. In other embodiments, the unified data management (UDM) node of the 5GC may be updated with the UE's current subscription information. The subscription information may be used by the AMF node of the 5GC in performing an authentication process.

As used herein, the term "user" is intended to be broadly interpreted to include a user device or a user of a user device. Also, the term "user," and "subscriber" may be used interchangeably. Furthermore, the term "subscription" is intended to refer to a network services subscription unless otherwise indicated.

Figure 1:
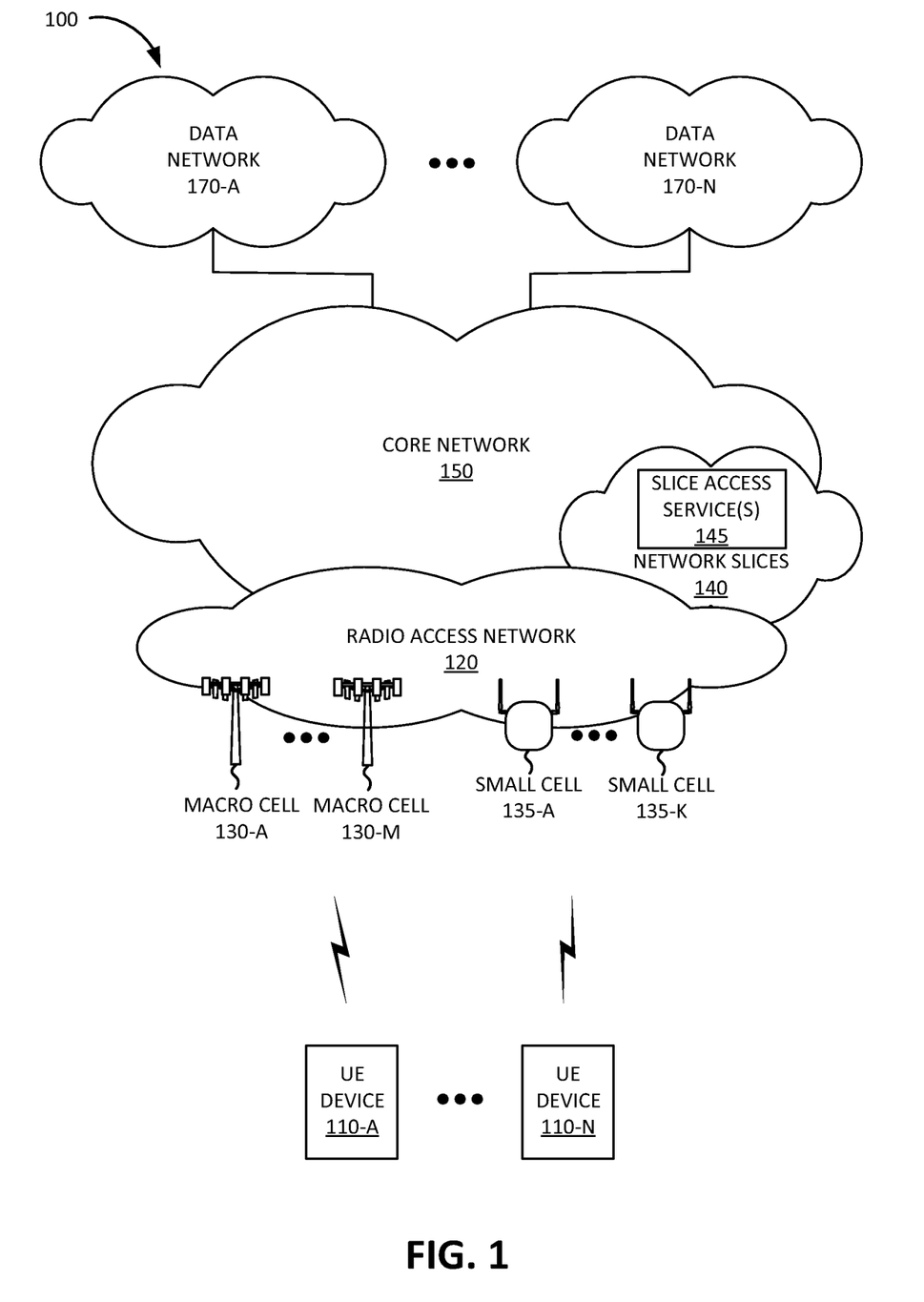
FIG. 1 illustrates an exemplary environment in which an exemplary embodiment of a small cell accessibility service may be implemented.

FIG. 1 is a diagram of an exemplary environment 100 in which the systems and/or methods described herein may be implemented. As shown in FIG. 1, environment 100 may include UE devices 110-A to 110-N (referred to herein collectively as "UE devices 110" and individually as "UE device 110"), a RAN 120 that includes macro cells 130-A to 130-M (referred to herein collectively as "macro cells 130" and individually as "macro cell 130"), and small cells 135-A to 135-K (referred to herein collectively as "small cells 135" and individually as "small cell 135"), a network slice 140 that include slice access service(s) 145, a core network 150, and data networks 170-A to 170-N (referred to herein collectively as "data networks 170" and individually as "data network 170").

UE device 110 may include any device with cellular wireless communication functionality. For example, UE device 110 may include a handheld wireless communication device (e.g., a mobile phone, a smart phone, a tablet device, etc.); a wearable computer device (e.g., a head-mounted display computer device, a head-mounted camera device, a wristwatch computer device, etc.); a laptop computer, a tablet computer, or another type of portable computer; a desktop computer; a customer premises equipment (CPE) device, such as a set-top box or a digital media player (e.g., Apple TV, Google Chromecast, Amazon Fire TV, etc.), a WiFi access point, a smart television, etc.; a portable gaming system; a global positioning system (GPS) device; a home appliance device; a home monitoring device; and/or any other type of computer device with wireless communication capabilities and a user interface.

In some implementations, UE device 110 may communicate using machine-to-machine (M2M) communication, such as MTC, and/or another type of M2M communication for IoT applications. For example, UE device 110 may include a health monitoring device, an asset tracking device, an autonomous vehicle control device, a climate controlling device, a device controlling a manufacturing system, a device controlling a security system, a device controlling a power system, a device controlling a financial transaction system, and/or another type of electronic device.

RAN 120 may enable UE devices 110 to connect to core network 150 via base stations such as macro cells 130 and/or small cells 135, using cellular wireless signals. RAN 120 may include, for example, one or more central units (CUs) and distributed units (DUs) (not shown in FIG. 1) that enable and manage connections from macro cells 130 and/or small cells 135 to core network 150. RAN 120 may include features associated with a Long Term Evolution (LTE) Advanced (LTE-A) network and/or a 5G core network or other advanced network, such as management of 5G NR base stations; carrier aggregation; advanced or massive multiple-input and multiple-output (MIMO) configurations (e.g., an 8×8 antenna configuration, a 16×16 antenna configuration, a 256×256 antenna configuration, etc.); cooperative MIMO (CO-MIMO); relay stations; Heterogeneous Networks (HetNets) of overlapping small cells and macrocells; Self-Organizing Network (SON) functionality; MTC functionality, such as 1.4 megahertz (MHz) wide enhanced MTC (eMTC) channels (also referred to as category Cat-M1), Low Power Wide Area (LPWA) technology such as Narrow Band (NB) IoT (NB-IoT) technology, and/or other types of MTC technology; and/or other types of LTE-A and/or 5G functionality.

Macro cell 130 may each include a 5G NR base station (e.g., a gNodeB) and/or a 4G LTE base station (e.g., an eNodeB). Macro cell 130 and/or small cell 135 may each include devices and/or components configured to enable cellular wireless communication with UE devices 110. For example, macro cell 130 and/or small cell 135 may each include a radio frequency (RF) transceiver configured to communicate with UE devices 110 using a 5G NR air interface and a 5G NR protocol stack, a 4G LTE air interface and a 4G LTE protocol stack, and/or using another type of cellular air interface. Macro cell 130 and/or small cell 135 may each enable communication with core network 150 to enable core network 150 to authenticate UE devices 110 with a subscriber management device (e.g., Home Subscriber Server (HSS) in 4G, UDM in 5G, etc.).

Macro cell 130 may be associated with a cell tower or mast, and may include a high-power RF transmitter that provides coverage to a large area in comparison to small cell 135. Small cell 135 may include a small cell, such as a microcell, picocell, femtocell, and/or another type of small cell that includes an RF transmitter with a lower power output than the RF transmitter associated with macro cell 130 and may provide coverage for a smaller area than the coverage area associated with macro cell 130. For example, in some situations, the coverage area of a particular small cell 135 may be entirely subsumed by the coverage area of a particular macro cell 130.

A particular small cell 135 may allow a particular UE device 110 to attach if UE device 110 is a member of the particular CAG small cell. Small cell 135 may, while operating in a closed mode, and when UE device 110 is within the coverage area of small cell 135 and not a member of CAG access small cell 135, not allow UE device 110 to attach. Small cell 135 may be configured to support multiple slice networks 140. For example, CAG small cell may, based on a network-wide slice network exemption policy, allow attachment by non-member UE devices 110 attempting to access application services provided over an exempted network slice 140.

UE device 110 may execute one or multiple application services using network slices 140. Network slices 140 may employ a virtual network architecture that enables multiple logical networks to be implemented on top of a shared physical network infrastructure using software defined networking (SDN) and/or network function virtualization (NFV). Each logical network, referred to as a "network slice," may encompass an end-to-end virtual network with dedicated or shared storage and/or computational resources that include access network components, clouds, transport, central processing unit (CPU) cycles, memory, etc. Furthermore, each network slice 140 may be configured to meet a different set of requirements and be associated with a particular QoS class, a type of service, and/or a particular group of customers associated with mobile communication devices.

According to an implementation, one or multiple network slices 140 may be configured to provide subscription-based services (e.g., low latency, high QoS, etc.) to UE devices 110 via small cells 135. For example, network slice 140 may be provisioned on a small cell 135—basis to be exempt from UE membership requirements for connecting to small cell 135, according to a configuration by an administrator for example, while performing mobile telephony activation services. Additionally, or alternatively, network slice 140 may be provisioned on a slice network 140—basis to be exempted from UE membership requirements for connecting to small cell 135 based on an MNO system-wide slice exemption policy pushed to a core network 150 node (e.g., a UDM).

According to implementations described herein, slice access service devices 145 may provide a network slice exemption flag, a bit, or another suitable data instance to a core network 150 node (e.g., UDM) using UE Route Selection Policy (URSP) rules, Protocol Configurations Options (PCO) values, and/or communications with an intervening MNO utility application. The slice exemption flag may be pushed to small cell 135 and/or UE device 110. UE device 110 may store the network slice exemption flag, for example, in its modem.

Core network 150 may be managed by a provider of cellular wireless communication services and may manage communication sessions of subscribers connecting to core network 150 via RAN 120. For example, core network 150 may establish an Internet Protocol (IP) connection between UE devices 110 and other networks, such as data network 170. In some implementations, core network 150 may include a 5GC network. In other implementations, core network 150 may include a 4G LTE core network (e.g., an evolved packet core (EPC) network). The components of core network 150 may include NFs. The NFs may be implemented as dedicated hardware components and/or as virtualized functions implemented on top of a common shared physical infrastructure using SDN. For example, an SDN controller may implement the components of core network 150 using an adapter implementing a virtual network function (VNF) virtual machine, a cloud native function (CNF) container, an event driven serverless architecture interface, and/or another type of SDN architecture. The common shared physical infrastructure may be implemented using one or more devices 200 described below with reference to FIG. 2 in a cloud center. Additionally, or alternatively, some, or all, of the common shared physical infrastructure may be implemented using one or more devices 200 implemented in slice access service devices 145.

Data network 170 may include a packet data network. Data network 170 may be associated with an access point name (APN) and UE device 110 may request a connection to data network 170 using the APN. Data network 170 may include, and/or be connected to and enable communication with a local area network (LAN), a wide area network (WAN), a metropolitan area network (MAN), an autonomous system (AS) on the Internet, an optical network, a cable television network, a satellite network, an ad hoc network, an intranet, or a combination of networks.

Although FIG. 1 shows exemplary components of environment 100, in other implementations, environment 100 may include fewer components, different components, differently arranged components, or additional components than depicted in FIG. 1. Additionally, or alternatively, one or more components of environment 100 may perform functions described as being performed by one or more other components of environment 100.

Figure 2:
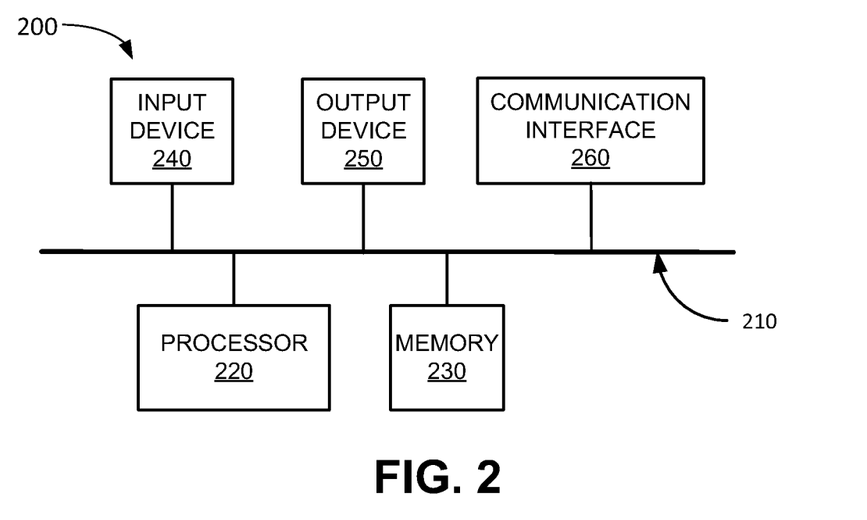
FIG. 2 is a diagram illustrating exemplary components of a device that may be included in a component of an environment according to an implementation described herein.

FIG. 2 illustrates example components of a device 200 according to an implementation described herein. UE device 110, macro cell 130, small cell 135, slice access service device 145, and/or other components of environment 100, may each include one or multiple devices 200. As shown in FIG. 2, device 200 may include a bus 210, a processor 220, a memory 230, an input device 240, an output device 250, and a communication interface 260.

Bus 210 may include a path that permits communication among the components of device 200. Processor 220 may include any type of single-core processor, multi-core processor, microprocessor, latch-based processor, and/or processing logic (or families of processors, microprocessors, and/or processing logics) that interprets and executes instructions. In other embodiments, processor 220 may include an application-specific integrated circuit (ASIC), a field-programmable gate array (FPGA), and/or another type of integrated circuit or processing logic.

Memory 230 may include any type of dynamic storage device that may store information and/or instructions, for execution by processor 220, and/or any type of non-volatile storage device that may store information for use by processor 220. For example, memory 230 may include a random access memory (RAM) or another type of dynamic storage device, a read-only memory (ROM) device or another type of static storage device, a content addressable memory (CAM), a magnetic and/or optical recording memory device and its corresponding drive (e.g., a hard disk drive, optical drive, etc.), and/or a removable form of memory, such as a flash memory.

Input device 240 may allow an operator to input information into device 200. Input device 240 may include, for example, a keyboard, a mouse, a pen, a microphone, a remote control, an audio capture device, an image and/or video capture device, a touch-screen display, and/or another type of input device. In some embodiments, device 200 may be managed remotely and may not include input device 240. In other words, device 200 may be "headless" and may not include a keyboard, for example.

Output device 250 may output information to an operator of device 200. Output device 250 may include a display, a printer, a speaker, and/or another type of output device. For example, device 200 may include a display, which may include a liquid-crystal display (LCD) for displaying content to the customer. In some embodiments, device 200 may be managed remotely and may not include output device 250. In other words, device 200 may be "headless" and may not include a display, for example.

Communication interface 260 may include a transceiver that enables device 200 to communicate with other devices and/or systems via wireless communications (e.g., radio frequency, infrared, and/or visual optics, etc.), wired communications (e.g., conductive wire, twisted pair cable, coaxial cable, transmission line, fiber optic cable, and/or waveguide, etc.), or a combination of wireless and wired communications. Communication interface 260 may include a transmitter that converts baseband signals to radio frequency (RF) signals and/or a receiver that converts RF signals to baseband signals. Communication interface 260 may be coupled to one or more antennas/antenna arrays for transmitting and receiving RF signals.

Communication interface 260 may include a logical component that includes input and/or output ports, input and/or output systems, and/or other input and output components that facilitate the transmission of data to other devices. For example, communication interface 260 may include a network interface card (e.g., Ethernet card) for wired communications and/or a wireless network interface (e.g., a WiFi) card for wireless communications. Communication interface 260 may also include a universal serial bus (USB) port for communications over a cable, a Bluetooth™ wireless interface, a radio-frequency identification (RFID) interface, a near-field communications (NFC) wireless interface, and/or any other type of interface that converts data from one form to another form.

As will be described in detail below, device 200 may perform certain operations relating to membership exemption for UE devices in the RF coverage area of a CAG small cell. Device 200 may perform these operations in response to processor 220 executing software instructions contained in a computer-readable medium, such as memory 230. A computer-readable medium may be defined as a non-transitory memory device. A memory device may be implemented within a single physical memory device or spread across multiple physical memory devices. The software instructions may be read into memory 230 from another computer-readable medium or from another device. The software instructions contained in memory 230 may cause processor 220 to perform processes described herein. Alternatively, hardwired circuitry may be used in place of, or in combination with, software instructions to implement processes described herein. Thus, implementations described herein are not limited to any specific combination of hardware circuitry and software.

Although FIG. 2 shows exemplary components of device 200, in other implementations, device 200 may include fewer components, different components, additional components, or differently arranged components than depicted in FIG. 2. Additionally, or alternatively, one or more components of device 200 may perform one or more tasks described as being performed by one or more other components of device 200.

Figure 3:
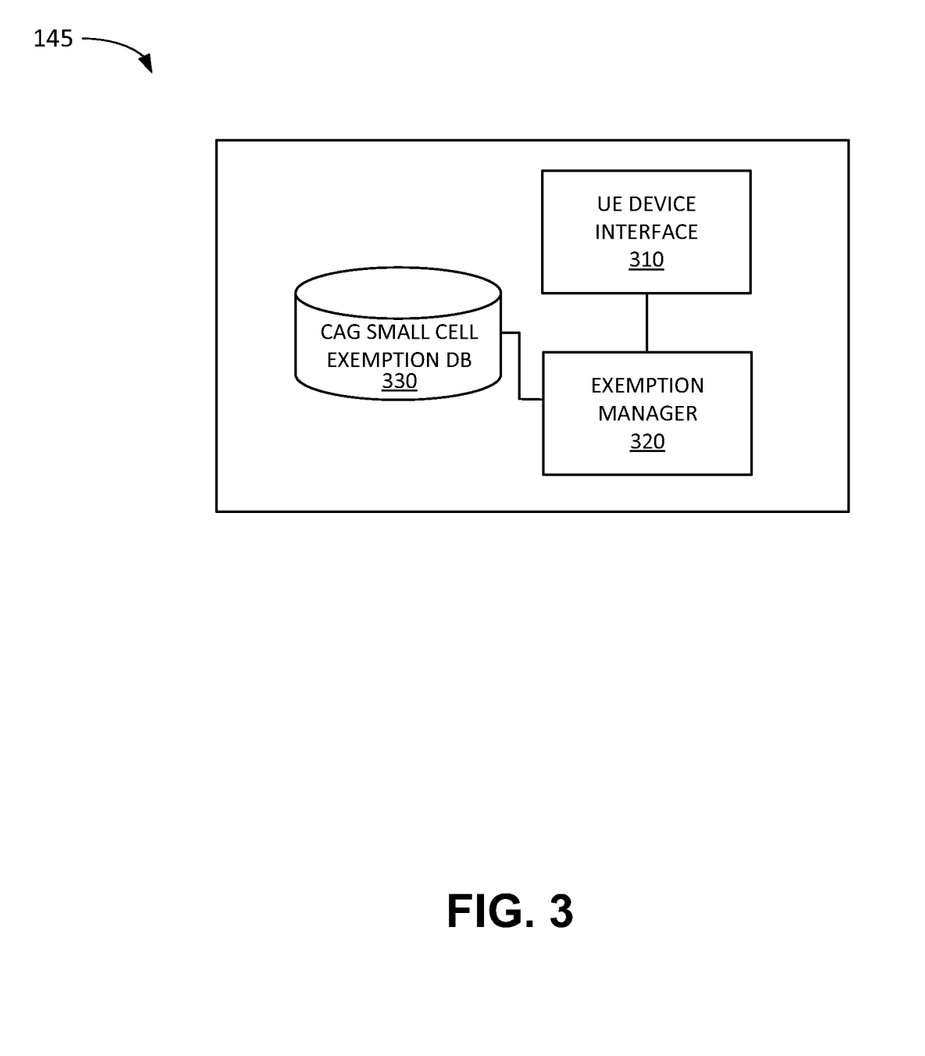
FIG. 3 is a diagram illustrating exemplary components of a slice access service device according to an implementation described herein.

FIG. 3 is a diagram illustrating exemplary components of slice access service device 145. The components of slice access service device 145 may be implemented, for example, via processor 220 executing instructions from memory 230. Alternatively, some or all of the components of slice access service device 145 may be implemented via hard-wired circuitry. As shown in FIG. 3, slice access service device 145 may include a UE device interface 310, an exemption manager 320, and a CAG small cell exemption database (DB) 330.

UE device interface 310 may be configured to communicate with UE devices 110. For example, UE device interface 310 may implement a 4G LTE air interface and/or a 5G NR air interface via macro cells 130 and/or small cells 135. Exemption manager 320 may receive, manage, and communicate MNO-defined policies for exemption to CAG membership requirements. For example, exemption manager 320 may use subscription information to generate a URSP NAS message that includes an attribute (e.g., flag) that indicates whether individual network slices are to be exempted from CAG small cell membership requirements.

Exemption manager 320 may send the exemption policy to UE device 110 upon URSP registration. Exemption manager 320 may update other nodes of core network 150 with the subscription information, for example, including the corresponding exemption policies.

CAG small cell exemption DB 330 may store information relating to slice exemption policies. In some embodiments, the slice exemption policies may be stored with other information, such as a session and service continuity (SSC) mode, data network name (DNN) and/or an application ID, for inclusion in a USRP NAS message, or any other signaling. For example, the USRP NAS message may include an exemption flag that indicates the exemption status (e.g., "yes" or "no," etc.), on a per slice basis. The slice exemption status may specify one or each of multiple slice ID numbers. CAG small cell exemption device DB 330 may be updated based on policies received from the MNO. Exemption manager 320 may retrieve the exemption status information stored in CAG small cell exemption device DB 330.

Although FIG. 3 shows exemplary components of slice access service device 145, in other implementations, slice access service device 145 may include fewer components, different components, additional components, or differently arranged components than depicted in FIG. 3. Additionally, or alternatively, one or more components of macro cell 130 may perform one or more tasks described as being performed by one or more other components of slice access service device 145.

Figure 4:
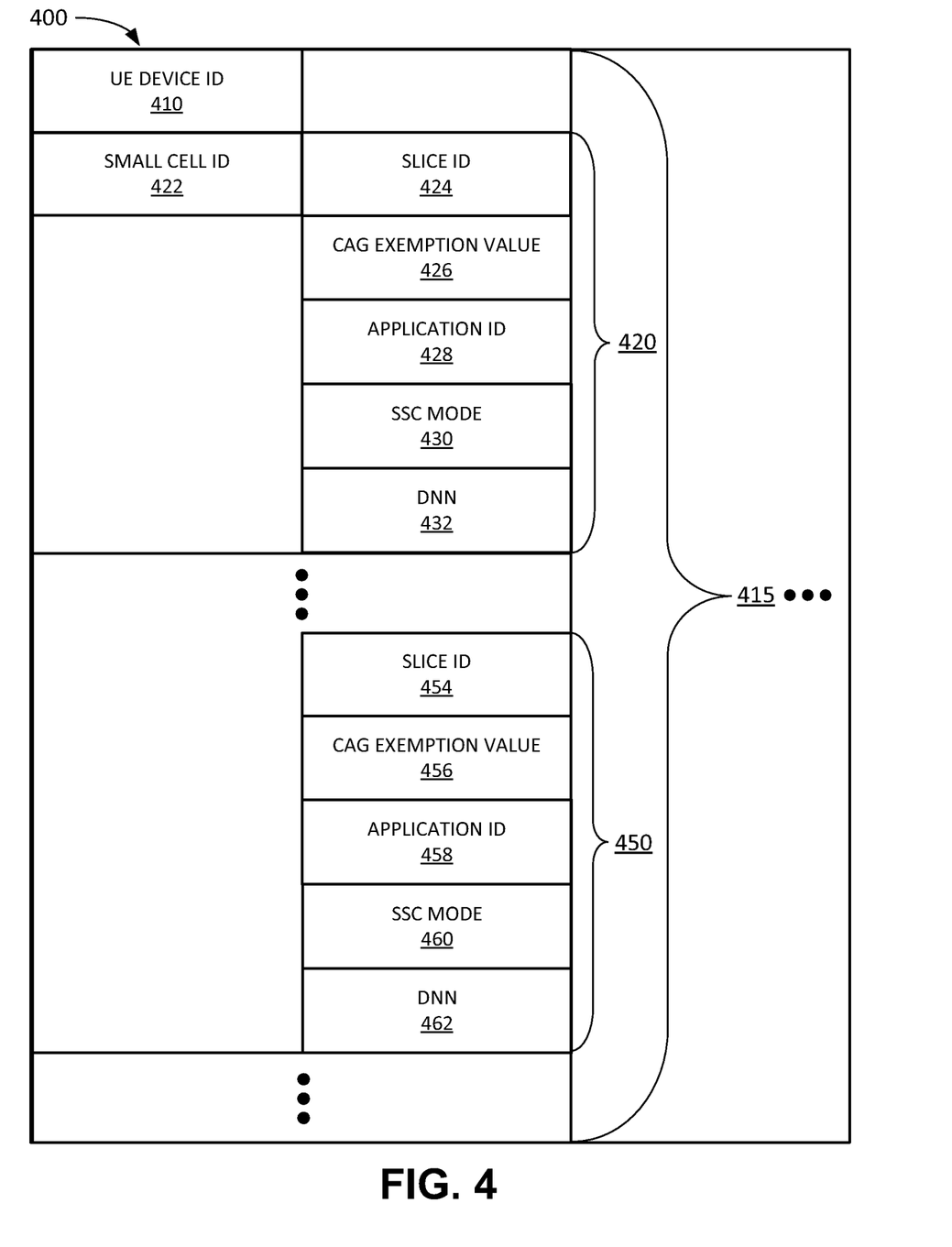
FIG. 4 is a diagram illustrating exemplary components of a user equipment (UE) device database according to an implementation described herein.

FIG. 4 is a diagram illustrating a UE modem DB 400 of a UE modem that may manage the physical layer and connectivity for UE device 110. The UE modem may include, for example, a 5G/NR modem that performs processing, modulation, demodulation, and/or other signal processing for 5G/NR communications of UE device 110. UE modem DB 400 may store URSP rules and/or access the URSP rules from a SIM, a SIM-like device, or another secure element (not shown) of UE device 110. According to implementations described herein, modem 400 may receive updated URSP rules from slice access service device 145 corresponding to subscription-based exemption policies.

Exemplary subscription-based policy information stored in modem 400 associated with a UE device ID field 410 may include a CAG small cell device record 415 for a particular CAG small cell device 135. Each CAG small cell device record 415 may store URSP NAS message information relating to multiple network slices 140. In one embodiment, small cell device record 415 may identify multiple network slices that are supported by CAG small cell devices 135 for which UE device 110 is or is not a member.

UE device ID field 410 may store an ID associated with a particular UE device 110. For example, UE device ID field 410 may store a Mobile Station International Subscriber Directory Number (MSISDN), a Mobile Directory Number (MDN), an International Mobile Subscriber Identity (IMSI), an International Mobile Equipment Identity (IMEI), an IP address, a Media Access Control (MAC) address, and/or another type of identifier associated with UE device 110.

First slice policy data 420 in small cell device record 415 may store information relating to an MNO-defined slice exemption policy. First slice policy data 420 may include a small cell ID field 422, a slice ID field 424, a CAG exemption value field 426, an application ID field 428, an SSC mode field 430, and a DNN field 432. First slice policy data 420 may include other fields. Second slice policy data 450 may store information relating to another MNO-defined slice exemption policy for small cell ID 422. Second slice policy data 450 may similarly include a slice ID field 454, a CAG exemption value field 456, an application ID field 458, an SSC mode field 460, and a DNN field 462. Second slice policy data 450 may include other fields.

Small cell ID field 422 may store an ID associated with a particular small cell configured to operate in a CAG mode and/or an open access group mode. Additionally, small cell ID field 422 may include an ID identifying MDNs associated with UE membership list for the closed cell coverage, and/or other types information associated with access to a core network node via the small cell identified in small cell ID field 422. In one embodiment, the CAG small cell membership list may be generated and/or updated via a SIMOTA procedure or the like. In other embodiments, small cell device record 415 for UE devices that are members of the CAG small cell may not store second slice policy data 450. Slice ID field 424 may include information identifying multiple network slices that are supported by small cell 135.

CAG exemption value field 426 may include an attribute (e.g., flag) indicating a status of the network slice with respect to system-wide and/or local exemption to CAG small cell membership requirements. Application ID field 428 may include information identifying an application service that may be accessed via the corresponding network slice supported by the small cell device 135. SSC mode field 430 may store information identifying the application and/or service continuity options for the UE. DNN field 432 may include information defining which data network over which traffic will be routed, such as subscription-based gaming, eMBB, IoT, and/or enterprise-specific application services. Second slice policy data 450 may include similar information for another identified slice network.

Although FIG. 4 shows exemplary components of UE modem DB 400, in other implementations, UE modem DB 400 may include fewer components, different components, additional components, or differently arranged components than depicted in FIG. 4.

Figure 5:
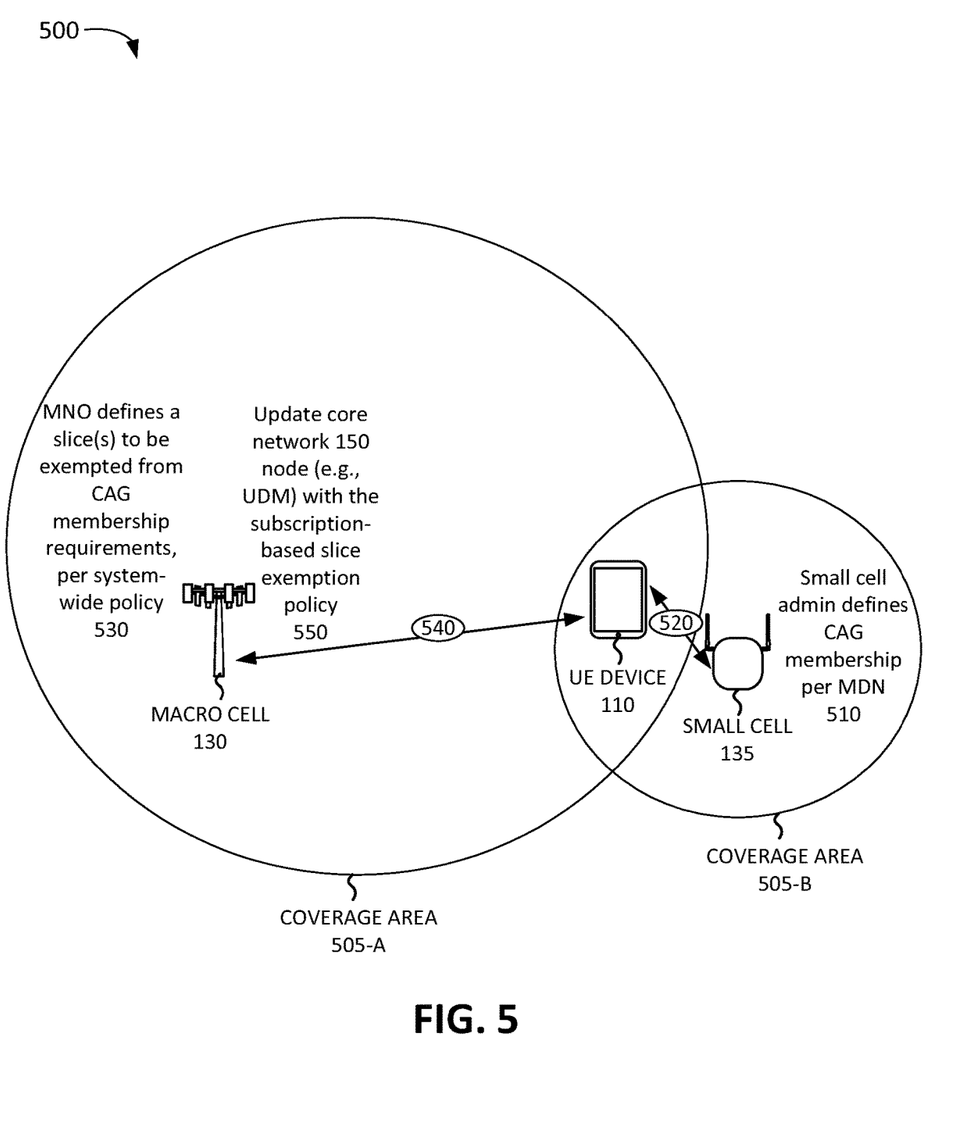
FIG. 5 illustrates a process for performing a small cell accessibility service according to an implementation described herein.
Figure 6A:
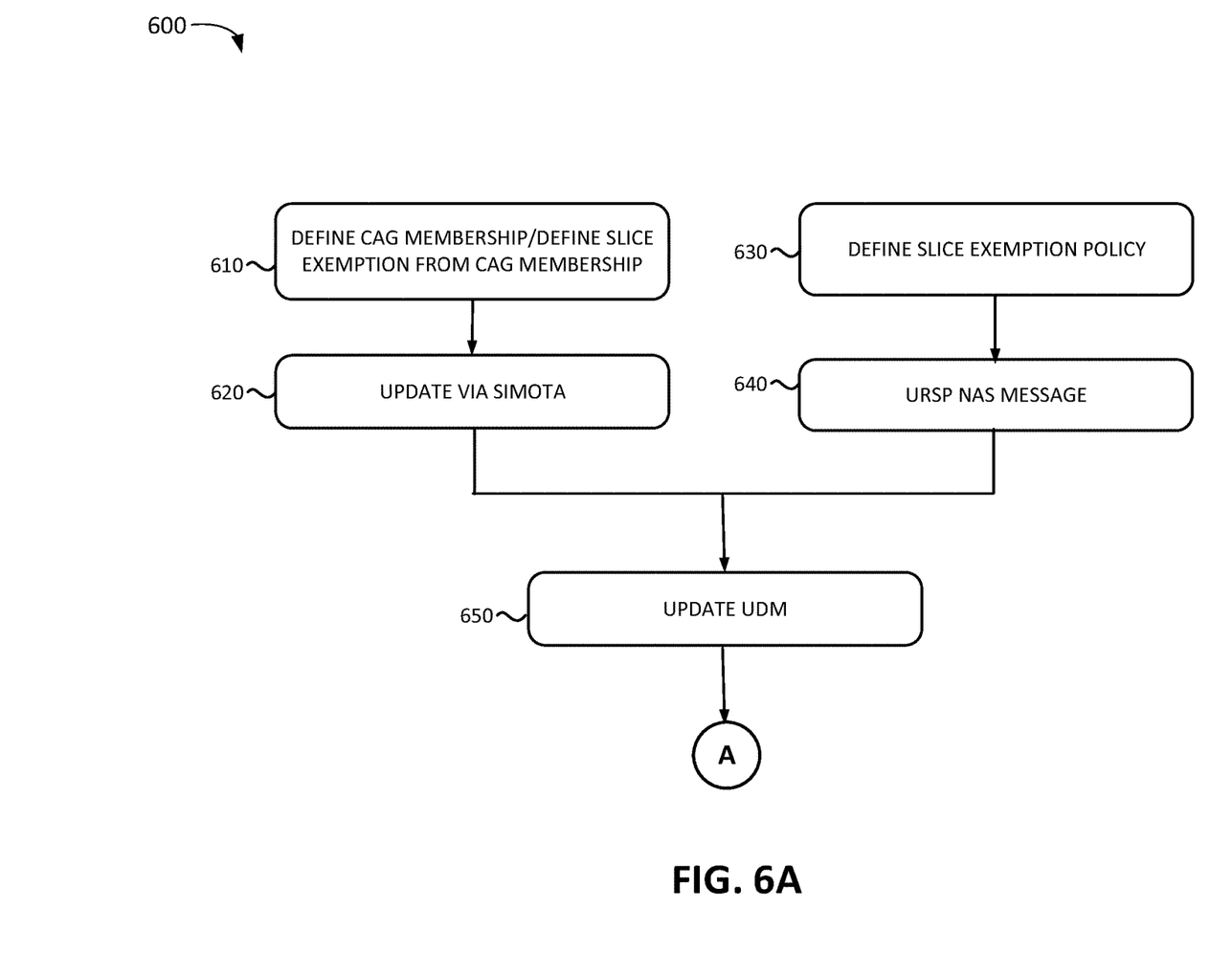
FIGS. 6A and 6B illustrate a flow diagram according to an implementation described herein.

FIG. 5 is a diagram of a signal flow 500 according to an implementation described herein, and as shown in FIG. 6A as a provisioning flow 600. Signal flow 500 may include a configuration flow for UE device 110, macro cell 130 with coverage area 505-A, and small cell 135 with coverage area 505-B. Macro cell 130 may be associated with network slices 140 and/or core network 150. An administrator for small cell 135 may, as part of provisioning of small cell 135, define CAG membership for all network slices supported by small cell 135 (step 510; block 610). Alternatively, or additionally, step 510 of signal flow 500 (block 610 of provisioning flow 600) may include the administrator of small cell 135 defining an exemption to CAG membership on a network slice-by-network slice basis.

Signal flow 500 may further include small cell 135 updating the CAG membership and/or exemption information to UE device 110, for example, via a SIMOTA message (signal 520; block 620 of provisioning flow 600). UE device 110 may store the membership and/or exemption information in a modem DB.

An MNO may issue a system-wide policy that defines one or multiple exemptions from CAG membership requirements (signal 530; block 630 of provisioning flow 600). The slice exemption policy may be communicated to UE device 110, for example, via a URSP registration procedure associated with a subscription-based service (signal 540; block 640 of provisioning flow 600). UE device 110 may store the exemption information in a modem DB. According to one implementation, a core network 150 node may be updated with the subscription-based slice exemption policy (block 550; block 650 of provisioning flow 600). For example, a mobile telephony activation services provisioning and slice activation system may push UE 110's subscription information to a UDM and/or to UE 110.

Figure 6B:
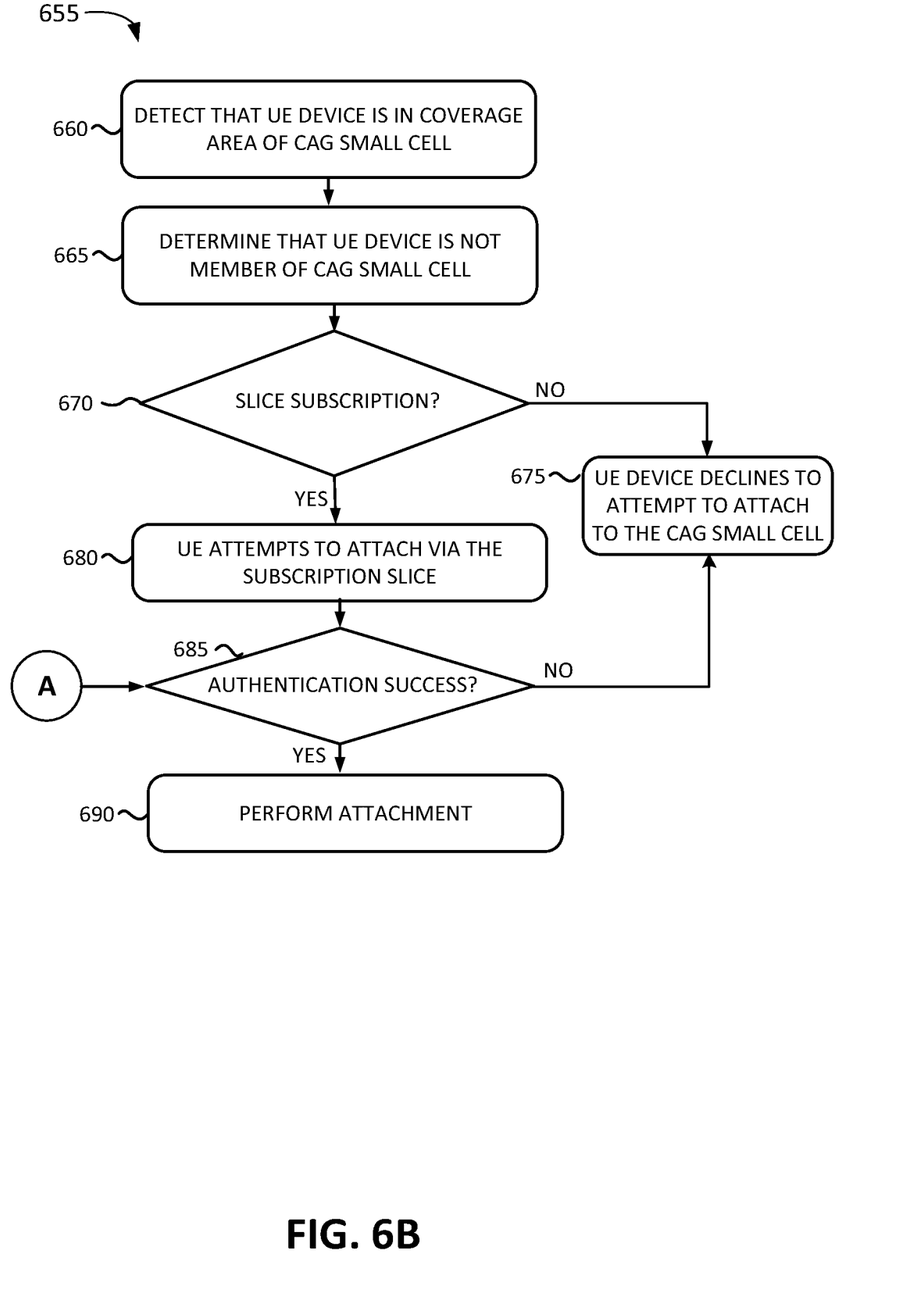

FIG. 6B is a diagram of an operational flow 655 according to an implementation described herein. As shown in FIG. 6B, operational flow 655 may include a scenario in which UE device 110 enters a coverage area 505-B of small cell 135 and may detect the signals broadcast by small cell 135 advertising its presence (block 660). In response, UE device 110 may determine that small cell 135 is operating in a CAG mode and UE device 110 is not a member of the CAG (block 665). For example, UE device 110 may retrieve information from a modem DB to determine that UE device 110 is not on an MDN list for the corresponding CAG ID.

In response to the determination that UE 110 is not a member of the CAG small cell 135, UE device 110 may determine whether UE device 110's subscription for service includes a slice exemption to CAG membership requirements for the particular network slice associated with the requested application service (block 670). For example, UE device 110 may retrieve information from a modem DB corresponding to the particular CAG ID. If UE 110 determines that UE device 110 has not subscribed to the particular network slice being requested (block 670—NO), UE device 110 will not attempt an attachment procedure with small cell 135 operating in CAG mode (block 675).

If UE 110 determines that UE device 110 has subscribed to the particular network slice being requested (block 670—YES), UE device 110 performs an attachment procedure to small cell 135 operating in CAG mode (block 680). In response to the attachment procedure, a core network 150 node may perform an authentication procedure for UE 110 (block 685). For example, an AMF may use updated subscription information retrieved from a UDM (represented by the encircled "A"), to perform an authentication of UE 110. If authentication of UE device 110 fails (block 685—NO), UE device 110 will not attempt an attachment procedure with small cell 135 operating in CAG mode (block 675). If authentication of UE device 110 succeeds (block 685—YES), UE device 110 performs an attachment procedure with small cell 135 operating in CAG mode (block 690).

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

For example, while a series of blocks have been described with respect to the series of signals of FIG. 5, and a series of blocks with respect to FIGS. 6A and 6B, the order of the blocks and/or signals may be modified in other implementations. Further, non-dependent blocks and/or signals may be performed in parallel.

Embodiments of the small cell accessibility service described herein may be used to provide cellular service, for example, to a first responder that enters a building in which RAN coverage is poor and small cell coverage is closed to non-members such as the first responder. Network slices typically used by first responders may be exempted from the CAG membership requirements. As another exemplary use case, a non-member IoT located in the small cell coverage area may benefit from the small cell accessibility service when the IoT is enabled to connect to the small cell CAG to access an exempted slice when an alarm condition is activated. As yet another example, an enterprise may want to limit staff to using a specific cellular application service to communicate with each other while on the premises. Many other use cases are possible.

It will be apparent that systems and/or methods, as described above, may be implemented in many different forms of software, firmware, and hardware in the implementations illustrated in the figures. The actual software code or specialized control hardware used to implement these systems and methods is not limiting of the embodiments. Thus, the operation and behavior of the systems and methods were described without reference to the specific software code—it being understood that software and control hardware can be designed to implement the systems and methods based on the description herein.

Further, certain portions, described above, may be implemented as a component that performs one or more functions. A component, as used herein, may include hardware, such as a processor, an ASIC, or a FPGA, or a combination of hardware and software (e.g., a processor executing software).

It should be emphasized that the terms "comprises"/ "comprising" when used in this specification are taken to specify the presence of stated features, integers, steps or components but does not preclude the presence or addition of one or more other features, integers, steps, components or groups thereof.

The term "logic," as used herein, may refer to a combination of one or more processors configured to execute instructions stored in one or more memory devices, may refer to hardwired circuitry, and/or may refer to a combination thereof. Furthermore, a logic may be included in a single device or may be distributed across multiple, and possibly remote, devices.

For the purposes of describing and defining the present invention, it is additionally noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

To the extent the aforementioned embodiments collect, store, or employ personal information of individuals, it should be understood that such information shall be collected, stored, and used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction used in the present application should be construed as critical or essential to the embodiments unless explicitly described as such. Also, as used herein, the article "a" is intended to include one or more items. Further, the phrase "based on" is intended to mean "based, at least in part, on" unless explicitly stated otherwise.

What is claimed is:
1. A user device comprising:
a processor configured to:
determine that the user device is within a coverage area of a small cell connected to a base station associated with an application service;
determine that the user device is not a member of the small cell;
identify a network slice for the application service;
determine whether a network services subscription for the small cell includes the network slice;
perform, when the network services subscription for the small cell includes the network slice, an attachment procedure to the small cell;
receive authorization for attaching to the small cell and accessing the application service via the network slice; and
initiate a network session on the network slice.

2. The user device of claim 1, wherein the processor is further configured to:
perform a network registration procedure; and
receive a policy rule, indicating that the network services subscription for the small cell includes the network slice, via a user equipment route selection policy (URSP) non-access stratum (NAS) message associated with the network registration procedure.

3. The user device of claim 1, wherein the processor is further configured to:
identify multiple network slices for the application service;
determine that the network services subscription for the small cell does not include one or more of the multiple network slices; and
select the network slice from among the multiple network slices.

4. The user device of claim 1, wherein the processor is further configured to:
identify another network slice for another application service;
determine that the network services subscription for the small cell does not include the other network slice; and
receive a denial of authorization to access the other application service via the other network slice.

5. The user device of claim 1, wherein the processor is further configured to determine that the small cell is operating in a closed access group (CAG) mode.

6. The user device of claim 5, wherein the processor is further configured to:
receive a subscriber identity module over-the-air (SIMOTA) update to a CAG small cell identifier (ID) and to a network slice ID.

7. The user device of claim 1, wherein, to receive the authorization, the processor is further configured to:
receive the authorization from an access and mobility management function (AMF) of a core network.

8. The user device of claim 1, wherein the network slice provides support for at least one of enhanced Mobile Broadband (eMBB) communication, ultra-reliable low latency communication (URLLC), or massive Machine Type Communication (mMTC).

9. A small cell device comprising:
a processor configured to:
identify a user device that is within a coverage area of the small cell device connected to a base station associated with an application service;
determine that the user device is not a member of the small cell;
identify a network slice for the application service;
determine whether a network services subscription for the small cell includes the network slice;

perform, when the network services subscription for the small cell includes the network slice, an attachment procedure to the user device;
receive authorization for attaching to the network slice and accessing the application service; and
enable a network session on the network slice.

10. The small cell device of claim 9, wherein the processor is further configured to:
identify multiple network slices for the application service;
determine that the network services subscription for the small cell does not include one or more of the multiple network slices; and
select the network slice from among the multiple network slices.

11. The small cell device of claim 9, wherein the processor is further configured to:
identify another network slice for another application service;
determine that the network services subscription for the small cell does not include the other network slice; and
receive a denial of authorization to access the other application service via the other network slice.

12. The small cell device of claim 9, wherein the processor is further configured to:
operate in a closed access group (CAG) mode; and
receive a network slice identifier (ID) for the network slice, wherein the network slice ID indicates that the network slice is exempt from the CAG mode.

13. The small cell device of claim 9, wherein the processor is further configured to:
receive a Protocol Configurations Options (PCO) message that indicates a subscription status for the small cell device.

14. The small cell device of claim 9, wherein the processor is further configured to:
receive the authorization from an access and mobility management function (AMF) of a core network.

15. A non-transitory, computer-readable storage media storing instructions, which, when executed by a processor of a user device, cause the user device to:
determine that the user device is within a coverage area of a small cell connected to a base station associated with an application service;
determine that the user device is not a member of the small cell;
identify a network slice for the application service;
determine whether a network services subscription for the small cell includes the network slice;
perform, when the network services subscription for the small cell includes the network slice, an attachment procedure to the small cell;
receive authorization for attaching to the small cell and accessing the application service via the network slice; and
initiate a network session on the network slice.

16. The non-transitory, computer-readable storage media of claim 15, further comprising instructions to cause the user device to:
perform a network registration procedure; and
receive a policy rule, indicating that the network services subscription for the small cell includes the network slice, via a user equipment route selection policy (URSP) non-access stratum (NAS) message associated with the network registration procedure.

17. The non-transitory, computer-readable storage media of claim 15, further comprising instructions to cause the user device to:
identify multiple network slices for the application service;
determine that the network services subscription for the small cell does not include one or more of the multiple network slices; and
select the network slice from among the multiple network slices.

18. The non-transitory, computer-readable storage media of claim 15, further comprising instructions to cause the user device to:
determine that the small cell is operating in a closed access group (CAG) mode.

19. The non-transitory, computer-readable storage media of claim 18, further comprising instructions to cause the user device to:
receive a subscriber identity module over-the-air (SIMOTA) update to a CAG small cell identifier (ID) and to a network slice ID.

20. The non-transitory, computer-readable storage media of claim 15, wherein, to receive the authorization, further comprising instructions to cause the user device to:
receive the authorization from an access and mobility management function (AMF) of a core network.

* * * * *